(12) United States Patent
Morris, Sr.

(10) Patent No.: US 6,850,827 B1
(45) Date of Patent: Feb. 1, 2005

(54) REARWARD VIEWING SYSTEM FOR USE WITH VEHICLES

(76) Inventor: Glenn H. Morris, Sr., 1192 Cumberland Rd., Chattanooga, TN (US) 37419

( * ) Notice: Subject to any disclaimer, the term of this patent is extended or adjusted under 35 U.S.C. 154(b) by 0 days.

(21) Appl. No.: 10/653,600

(22) Filed: Sep. 2, 2003

(51) Int. Cl.[7] .............................................. H06F 17/00
(52) U.S. Cl. ......................... 701/49; 701/301; 340/937; 348/148
(58) Field of Search ............................. 701/1, 36, 49, 701/300, 301; 340/436, 461, 903, 937; 345/7; 348/42, 51, 148, 149; 382/154

(56) References Cited

U.S. PATENT DOCUMENTS 6,373,964 B1 * 4/2002 Geissler et al. ............. 382/112
6,567,726 B2 * 5/2003 Sakiyama et al. ............. 701/1
6,693,519 B2 * 2/2004 Keirstead .................... 340/435
6,762,790 B1 * 7/2004 Matko et al. ............... 348/148

* cited by examiner

Primary Examiner—Richard M. Camby
(74) Attorney, Agent, or Firm—Stephen J. Stark; Miller & Martin PLLC

(57) ABSTRACT

A rearward viewing system having at least one mirror mounted by a bracket to an exterior portion of a vehicle. The bracket locates the mirror above the roof and forward of at least a portion of the windshield. A camera is directed toward the front of the vehicle at the mirror so that the mirror can provide a range of view of at least 60° and preferably more than 90° so that the normal blind spots of a driver are eliminated. A monitor receiving input from the camera provides a display for the driver.

20 Claims, 2 Drawing Sheets

US 6,850,827 B1

REARWARD VIEWING SYSTEM FOR USE WITH VEHICLES

BACKGROUND OF THE INVENTION

1. Field of the Invention

This invention relates to an apparatus useful with vehicles for viewing objects which are normally difficult for a driver to see such as those which would otherwise be in a "blindspot."

2. Prior Art

Numerous efforts have been undertaken to assist a driver of a vehicle in reducing blindspots. U.S. Pat. No. 6,567,726 shows a vehicle driving support system which includes a camera unit mounted to a rear portion of a vehicle aimed rearwardly therebehind. A display of images taken by the camera is located on an information display visible by the driver. This system is apparently utilized to assist in parking.

Although improvements have been made to rearward viewing systems, a need still exists to provide an improvement for visualizing blind spots on both sides of the vehicle as well as behind the vehicle, particularly for highway driving conditions.

SUMMARY OF THE INVENTION

A need exists for a reliable rearview imaging system to detect objects which may otherwise be in blindspots or which are otherwise difficult to view by a driver.

A need exists for a rearview imaging system capable of visualizing areas on either side of a vehicle as well as behind the vehicle simultaneously.

Another need exists to advantageously provide an image of areas which are normally in the blind spots including the sides of the vehicle as well as behind the vehicle to a video display visible by the driver.

Accordingly, the rearview system of the presently preferred embodiment of the invention has at least one mirror mounted by a bracket to an exterior portion of the vehicle. The bracket preferably positions the mirror so that it is out of the normal field of vision of the driver, but positioned so that it can advantageously provide rearward as well side looking views which are normally the driver's blind spot, or at least areas difficult for the driver to view with traditional side mirrors and rearview mirrors. A camera is positioned relative to the mirror so that a video display may be provided to the driver.

The mirror is preferably mounted along a centerline of a vehicle and above a roof of the vehicle. This positioning assists in viewing areas which would otherwise be obscured from view. The mountings are preferably flexible so that if a driver inadvertently runs under too low of an object, the mirror and camera deflect instead of breaking. The mirror also preferably has a convex surface to provide a wide-angle view so that objects on either side as well as behind the vehicle may be viewed by a single camera and single mirror.

BRIEF DESCRIPTION OF THE DRAWINGS

The particular features and advantages of the invention as well as other objects will become apparent from the following description taken in connection with the accompanying drawings in which.

DESCRIPTION OF THE DRAWINGS

Figure 1:
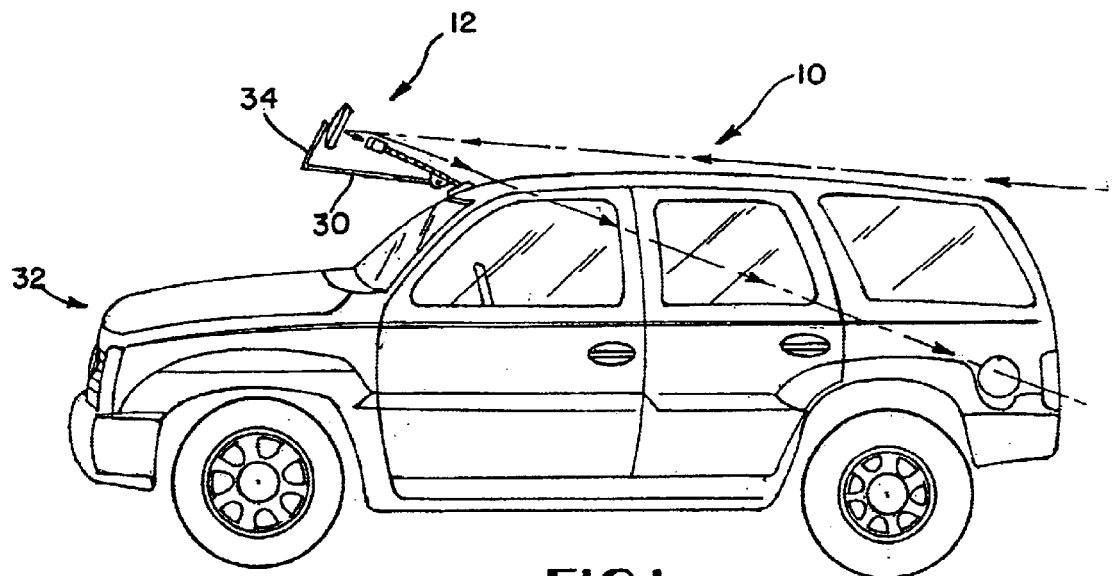
FIG. 1 is a side view of the vehicle equipped with the presently preferred embodiment of the present invention.

FIG. 1 shows a vehicle 10 having a rearview system 12 in accordance with the presently preferred embodiment of the present invention. The rearview system 12 is illustrated mounted along the center line 14 of the vehicle 10 in FIGS. 2 and 3.

Figure 2:
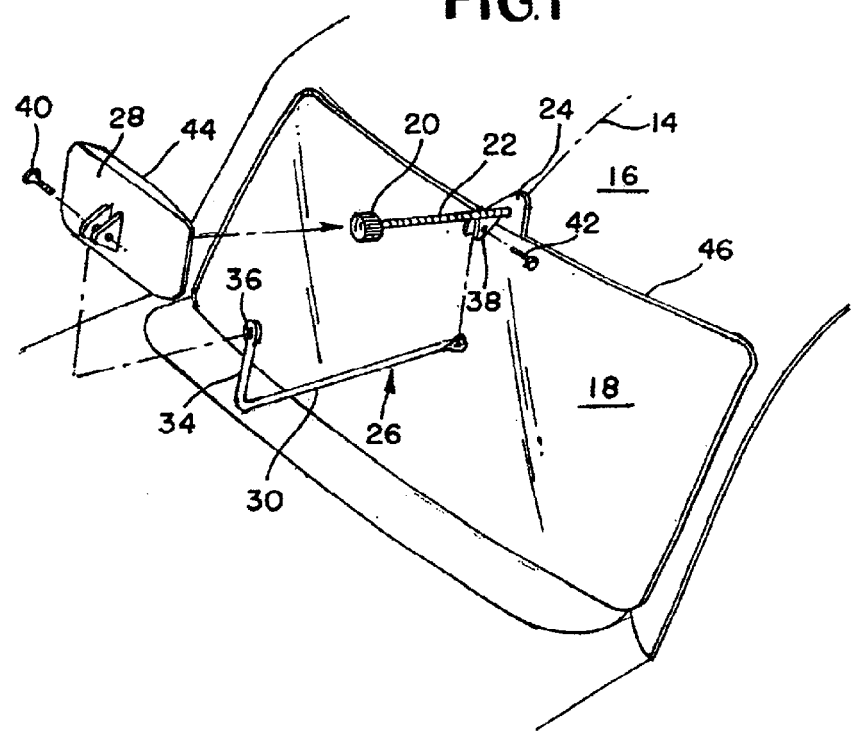
FIG. 2 is an exploded view of the rear view mirror and camera shown in FIG. 1.

The system 10 is preferably mounted to the hood 16 of the vehicle 10 or at least to a structural member located above the front windshield 18 as shown in FIG. 2. As shown in FIG. 2, the rearview system 12 is comprised of a camera 20 connected by a flexible arm 22 to a mount 24. Also connected to the mount 24 is a bracket 26 which connects to mirror 28.

The bracket 26, in addition to having a forwardly extending component illustrated by leg 30 which extends from a mount 24 towards the front 32 of the vehicle, further comprises a second leg 34 which extends upwardly, and preferably slightly rearwardly. This structure provides the second leg 34 at an angle to the first leg 30 such that if it were to contact a foreign object such as a tree branch or other low hanging object, the bracket 26 and thus the mirror 28 would tend to be deflected downwardly so that the mirror 28 and bracket 26 would probably not be damaged.

In the event of such an accident, the flexible coupling 22 connecting the camera 20 to the mount 24 is also designed to give, at least to some degree, to protect the vehicle 14 as well as the camera 20 and windshield 18.

The mirror 28 is illustrated connected to the second arm 34 at a pivotable connection 36. Furthermore, the first arm 30 of the bracket 26 is connected to the mount 24 at a pivotable connection 38 so that the elevation of the mirror along with its tilt may be set with connectors 40,42. The connectors 40,42 are useful in setting and/or at least temporarily fixing the angular positions at the connections 36,38.

Figure 3:
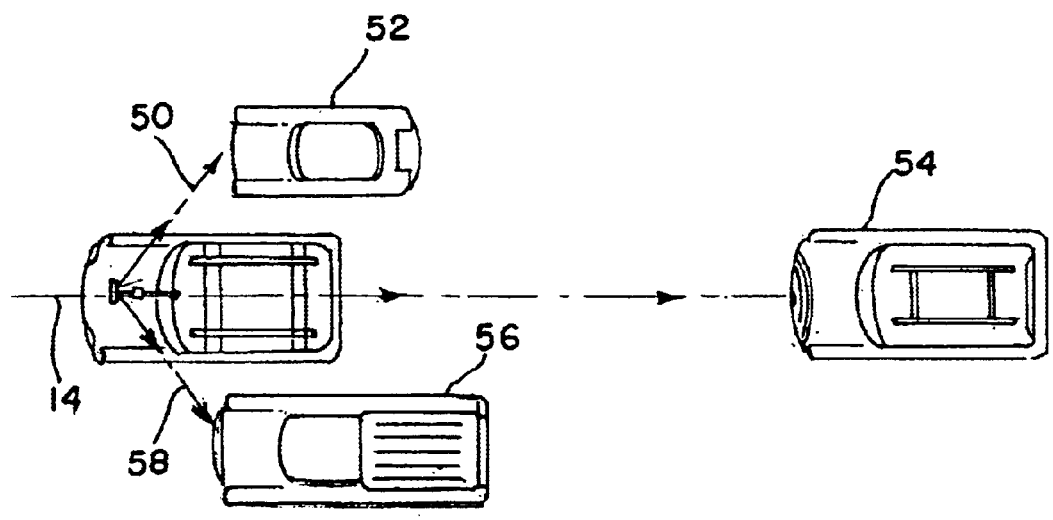
FIG. 3 is a top plan view of a vehicle equipped with the preferred embodiment of the present invention in operation.
Figure 4:
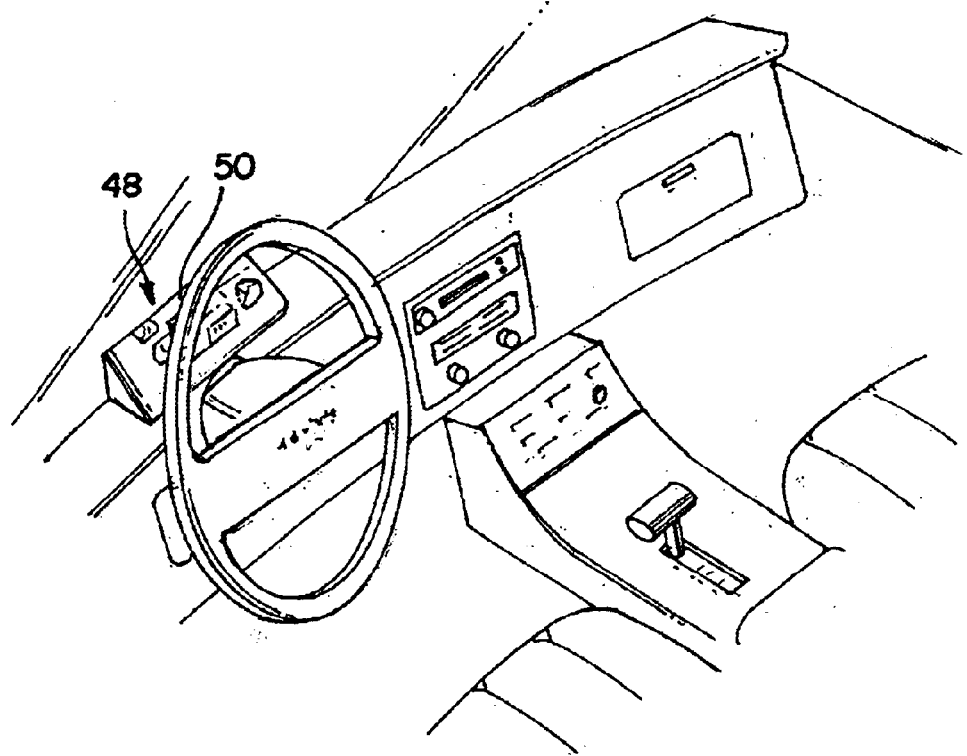
FIG. 4 is a perspective view of a display inside the cab of the vehicle using the preferred embodiment of the present invention.

As can be seen in FIG. 2, the reflective surface 44 of the mirror 28 is convex. As shown in FIGS. 1 and 3 the range of view provided by the mirror can be significantly greater by use of the concavity to allow the driver to see blind spots adjacent to and/or beside the vehicle 10 as well as other vehicles behind the car.

The camera 28 is preferably connected by at least one conductor to the display 48 which is in a monitor 50 viewable by the driver. The driver can now see objects which might otherwise have been in the driver's blind spots.

In FIG. 3, the field of vision viewed by system 10 covers a span of about 100° centered along the center line 14 of the car. Specifically, the right most limit is illustrated by arrow 50 which puts first vehicle 52 in the range of view to the driver (not shown). Additionally, a second vehicle 54 may also be in the range of view along the center line 14 of the vehicle. Finally, the third vehicle 56 is in the range of view as the left most range of view as illustrated by left arrow 58.

The range between the right most range of view 50 and left most range of view 58 corresponds to the total range of view provided to the driver. This range is preferably on the order of varying about 90°, and is illustrated as about 100°. In alternatively preferred embodiment the range of view is at least 50°, and more preferably 60°, preferably still 80° or greater. Obviously the range of view need not to extend to 180° since the mirror is located ahead of the driver. The driver would be able to see any such vehicle reported along that range out of the left and right windows.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A rearwardly viewing system for use with vehicles comprising:
   a vehicle having an exterior surface and supported by four wheels, said vehicle having a front end, a front windshield, a roof, and a centerline extending intermediate the four wheels;
   a mirror located external to the exterior surface of the vehicle and forward of at least a portion of the front windshield, said mirror connected to the vehicle by a bracket so that the mirror is located above the roof of the vehicle;
   a camera directed toward the front end of the vehicle at the mirror; and
   a monitor visible to a driver of the vehicle, said monitor receiving an input from the camera and providing a display to the driver.

2. The rearwardly viewing system of claim 1 wherein the mirror is located along the centerline of the vehicle.

3. The rearwardly viewing system of claim 1 further comprising a mount connected to one of the front windshield and roof, said mount supporting the mirror above the roof.

4. The rearwardly viewing system of claim 3 wherein the bracket extends toward the front end of the vehicle thereby supporting the mirror forward of the mount.

5. The rearwardly viewing system of claim 4 wherein the bracket further comprises a first leg extending toward the front end of the vehicle from the mount and a second leg extending upwardly, said second leg connected to the mirror.

6. The rearwardly viewing system of claim 5 wherein the second leg of the bracket extends at least partially away from the front end of the vehcile.

7. The rearwardly viewing system of claim 4 wherein the bracket is connected to the mount at a first rotationally adjustable connection.

8. The rearwardly viewing system of claim 4 wherein the bracket is connected to the mirror at a second rotationally adjustable connection.

9. A rearwardly viewing system comprising:
   a vehicle having an exterior surface and supported by four wheels, said vehicle having a front end and a back end, a front windshield, a roof, and a centerline extending intermediate the four wheels;
   a convex mirror connected to a mount on the roof of the vehicle whereby the mirror is supported above the roof of the vehicle and pointed toward the back end of the vehicle;
   a camera directed toward the front end of the vehicle at the mirror; and
   a monitor visible to a driver of the vehicle, said monitor receiving an input from the camera and providing a display to the driver.

10. The rearwardly viewing system of claim 9 wherein the camera is sufficient spaced from the mirror to provide at least a ninety degree range of view on the monitor.

11. The rearwardly viewing system of claim 10 wherein the range of view is centered about the centerline of the vehicle.

12. The rearwardly viewing system of claim 9 wherein the camera is mounted external to the vehicle.

13. The rearwardly viewing system of claim 9 wherein the camera is connected by a flexible coupling to the vehicle.

14. The rearwardly viewing system of claim 9 wherein the bracket further comprises a first leg oriented toward the back end of the vehicle.

15. The rearwardly viewing system of claim 14 wherein the bracket further comprises a second leg oriented toward the front end of the vehicle, said second leg extending further toward the front end of the vehicle than the first leg extends toward the back end of the vehicle.

16. A rearwardly viewing system comprising:
    a vehicle having an exterior surface and supported by four wheels, said vehicle having a front end and a back end, a front windshield, a roof, and a centerline extending intermediate the four wheels;
    at least one mirror connected to a mount whereby the at least one mirror is supported above the roof of the vehicle;
    a camera directed toward the front end of the vehicle at the at least one mirror; and
    a monitor visible to a driver of the vehicle, said monitor receiving an input from the camera and providing a display to the driver having a range of view extending at least sixty degrees at least substantially centered about the centerline of the vehicle.

17. The rearwardly viewing system of claim 16 wherein the camera is connected by a flexible coupling to the mount.

18. The rearwardly viewing system of claim 16 further comprising a bracket extending from the mount toward the front end of the vehicle thereby locating the mirror forward of the mount.

19. The rearwardly viewing system of claim 18 wherein the at least one mirror is angularly positionable relative to the bracket about an axis perpendicular to the centerline of the vehicle.

20. The rearwardly viewing system of claim 19 wherein the bracket is angularly positionable relative to the mount about an axis perpendicular to the centerline of the vehicle.

* * * * *